United States Patent Office 3,464,083
Patented Sept. 2, 1969

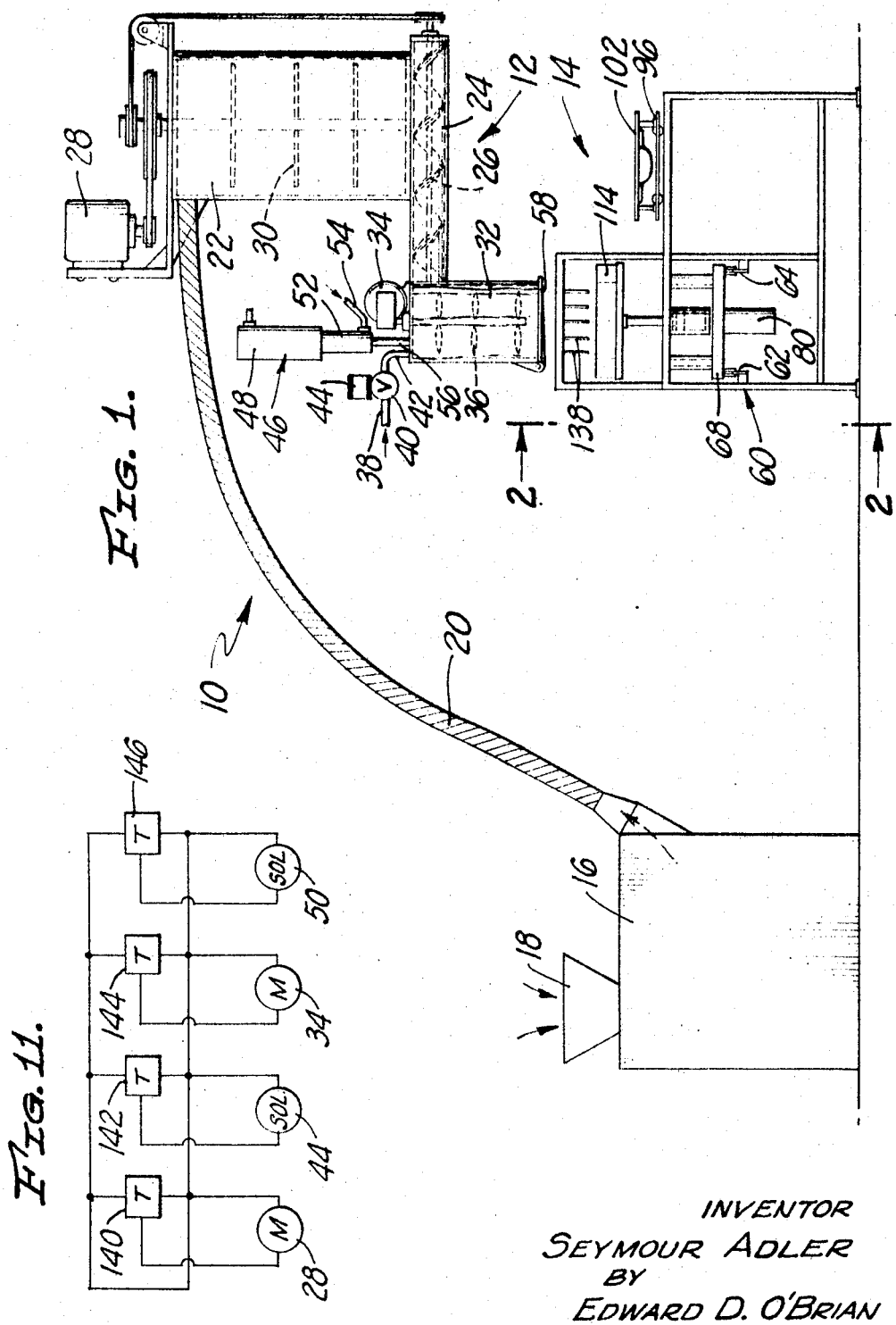

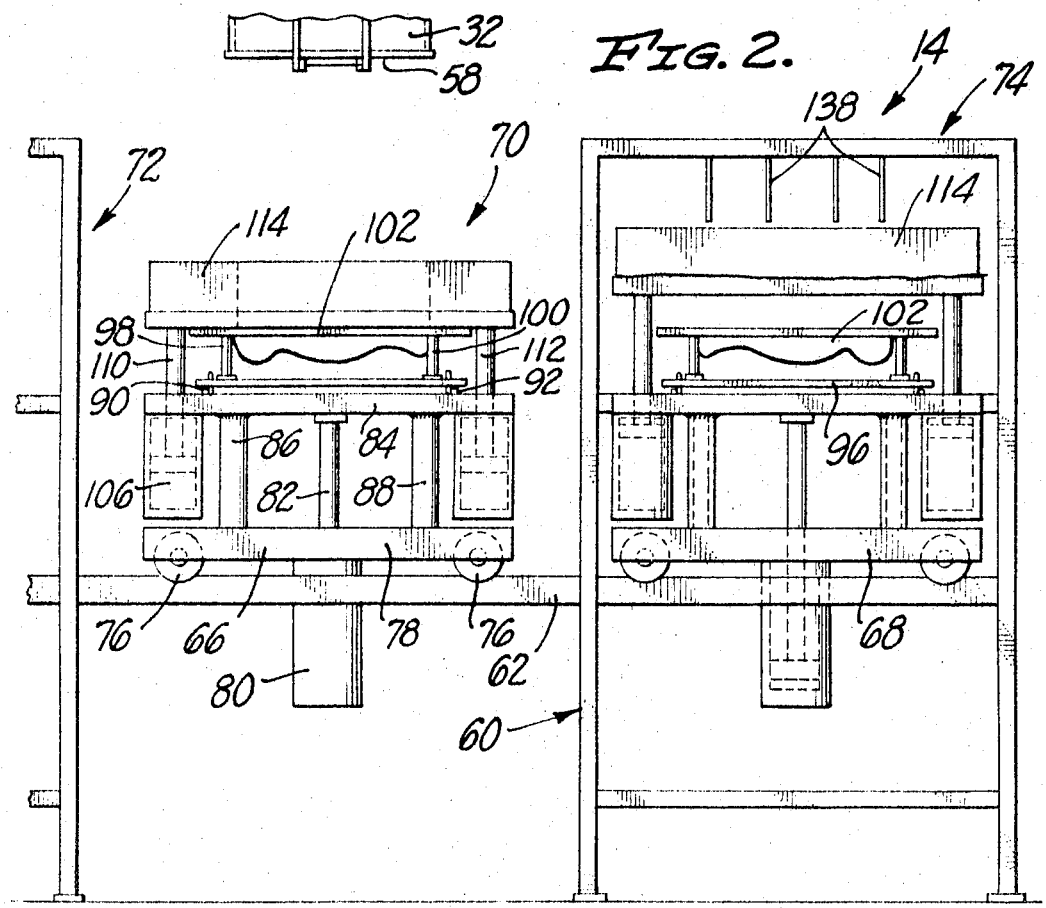
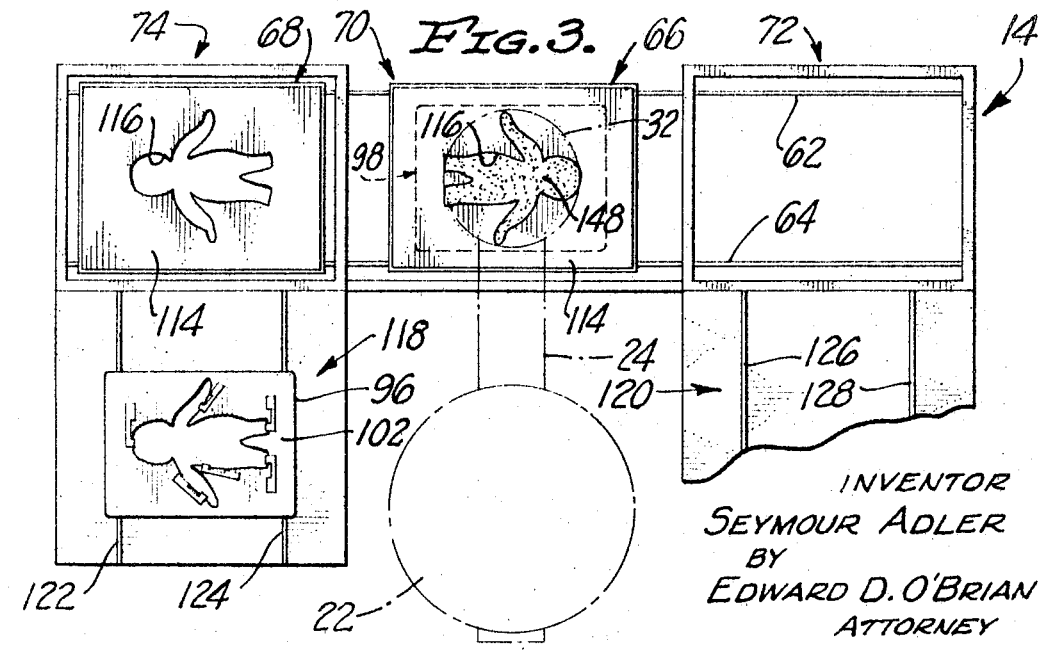

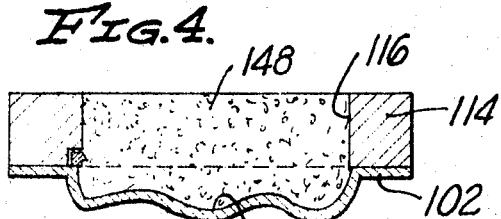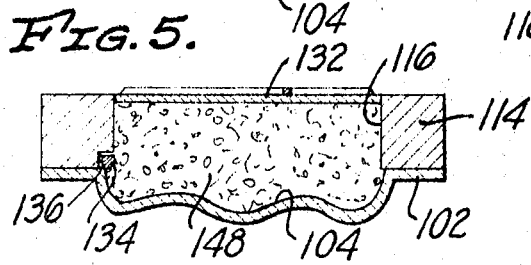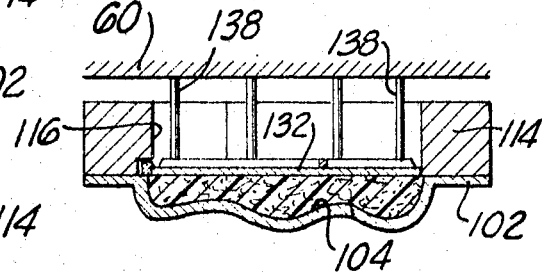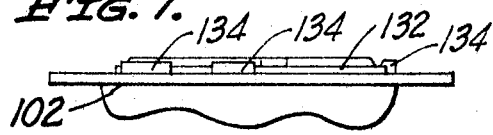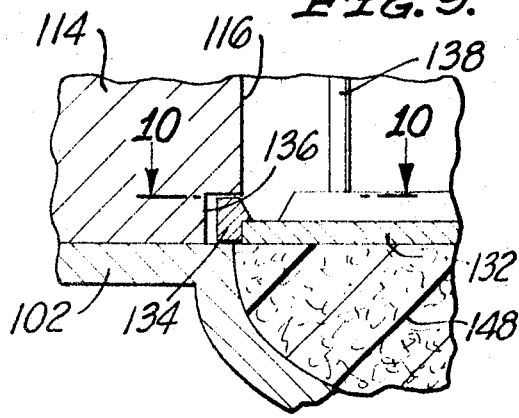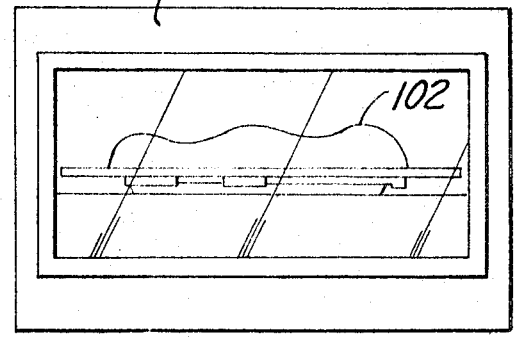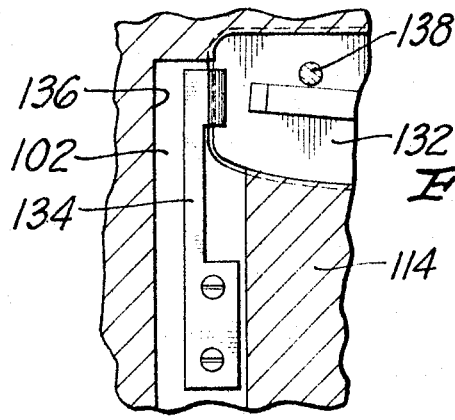

3,464,083
APPARATUS FOR MANUFACTURING ARTICLES
Seymour Adler, El Segundo, Calif., assignor to Mattel, Inc., Hawthorne, Calif., a corporation of California
Filed Feb. 16, 1967, Ser. No. 616,655
Int. Cl. B29c 3/02
U.S. Cl. 18—4                                    5 Claims

ABSTRACT OF THE DISCLOSURE

The apparatus comprises a storage chamber for chopped foamed material particles and a screw for extruding the chopped foamed material particles into a mixing chamber. The mixing chamber has mixing propellers which tumble the foam extruded therein. Adhesive is injected into the mixing chamber while the particles are tumbled. The adhesive coated particles are poured into a mold. The mold top is put in place and the mold is moved to a press station. Press structure presses the mold top into place and latches retain the mold top in place. Adhesive hardening treatment means is provided, preferably in the form of a furnace. The mold is thereupon placed in the furnace and the adhesive is set. The process comprises the introduction of predetermined quantities of chopped foamed material and adhesive into a mixing chamber, including the tumbling of the foam material during adhesive charging. The process further includes the steps of placing the adhesive coated foamed material particles in a mold, closing the mold and setting the adhesive.

BACKGROUND

This invention is directed to an apparatus for making formed resilient articles from chopped foamed material particles, particularly useful for foaming articles used as stuffed toy stuffing.

Polymer composition material has been foamed in the confines of a mold so that upon completion of foaming and setting of the material, a foamed, shaped structure results. Such is suitable for use as a body of a stuffed toy, to be later covered. Other stuffed toys employ a loose stuffing of chopped polymer composition foam inserted within a covering. In the first method the finished structure has the disadvantage of requiring new foam material, while the second has the disadvantage of having a stuffing in loose form, rather than in monolithic parts which have a desired external configuration. The apparatus of this invention produce a shaped stuffing material which can employ prefoamed material, plus overcome the need for foaming in place and permit the use of reclaimed foam material. Thus, the method and apparatus of this invention provide a shape stuffing which can be inexpensively and easily produced.

SUMMARY

This invention is directed to an apparatus for manufacturing articles and particularly articles made of chopped foam, which chopped foam is subsequently coated with adhesive, pressed and while in the pressed state the adhesive is cured. The apparatus thus comprises a chopped foamed polymer composition material storage hopper, and feeding means to feed a predetermined quantity of this foam into a mixing chamber. In the mixing chamber the foam is tumbled and adhesive is sprayed onto the exterior surfaces. Thereafter it is poured into a mold and the mold is closed by compressing the adhesive covered foamed particles. Pressing is sufficient to form this mixture into cohesive mass, with the particles in intimate contact with each other. After curing, the molded article is a coherent but flexible mass, the flexibility being primarily determined by the foam density. The process comprises the method steps including the mixing of the adhesive with the chopped polymer material foam, the loading of the mixture into a mold, the compression of the mixture in the mold.

Accordingly it is an object of this invention to provide an apparatus by which foamed polymer composition material in chopped form can be formed into an article which has the desired external configuration. It is a further object to provide an apparatus and method which economically produce foamed polymer composition material articles from a chopped foamed material, so inexpensive, reclaimed material can be used for the production of new shaped articles. It is still another object of this invention to provide an apparatus which includes all the necessary structure so that with a minimum of labor expenditure, finished shaped articles can be produced. It is a further object of this invention to provide a method by which chopped foamed polymer composition material can be shaped into a desired article. Other objects and advantages of this invention will become apparent from a study of the following portion of this specification, the claims and the attached drawings.

DESCRIPTION OF THE DRAWINGS

FIG. 1 is a side elevational view of the apparatus of this invention.

FIG. 2 is a partial enlarged elevational view taken generally along the line 2—2 of FIG. 1.

FIG. 3 is a top plan view looking down upon the mold dollies and supporting structure of the apparatus.

FIG. 4 is a section taken through one of the molds at the mold filling station, showing the mold filled with chopped foamed polymer composition material which has been coated with adhesive.

FIG. 5 is a view similar to FIG. 4 showing the mold cover in place.

FIG. 6 is a view similar to FIG. 5 showing the mold in the press station with the mold cover pressed into place.

FIG. 7 is a side elevational view of the mold showing its appearance after the pressing is completed.

FIG. 8 is a view into the oven showing the mold in place and the adhesive material being set.

FIG. 9 is an enlarged detail showing the latch structure which holds the mold cover in place.

FIG. 10 is a section taken generally along the line 10—10 of FIG. 9.

FIG. 11 is a schematic electric circuit showing the electric circuitry which controls the mixer and the introdution of material into the mixer.

DESCRIPTION

The machine of this invention is generally indicated at 10 in FIG. 1. The machine 10 comprises material preparation section 12 and molding section 14. The molding section 14 is shown in more detail in FIGS. 2 and 3. The material preparation section includes a source of chopped foamed synthetic polymer composition material, such as polyurethane foam. The foam may be prechopped, but it is preferably shredded in shredder 16. Material is delivered into shredder 16 by dumping it into hopper 18. Shredder 16 chops the foam into particles of appropriate size, preferably under one half inch in maximum dimension for the creation of the articles illustrated. Larger or smaller articles may require larger or smaller chopped foamed particles. Shredder 16 delivers the chopped foam by blowing it out of discharge pipe 20.

Chopped foam storage tank 22 receives the chopped foam from discharge pipe 20 and retains it until it is required. The bottom of tank 22 has screw conveyor casing 24 in communication therewith so that foam within tank 22 can fall into casing 24. Casing 24 is equipped with screw conveyor 26 which acts to feed the chopped foam out of storage tank 22. Feeder motor 28 is mounted on the top of tank 22 and is belted to drive both screw conveyor 26 and agitator 30. Agitator 30 is positioned within tank 22 to keep the foam therein loose and to permit it to properly feed to screw conveyor casing 24 so that it is discharged from tank 22 by action of the screw conveyor 26.

Conveyor casing 24 is directly connected into the side of mixing chamber 32 and is arranged so that when motor 28 is actuated the screw 26 discharges the chopped foam material into mixing chamber 32. Additionally, mixing chamber 32 is provided with mixer motor 34. Mixer motor 34 is connected to drive mixer blades 36 positioned within mixing chamber 32. Mixer blades 36 are preferably in the form of propeller blades which are angled upward so as to toss and tumble the foam particles within the chamber.

Mounted on top of mixing chamber 32 are adhesive supply structures. Line 38 is connected to a pressure tank containing a supply of one of the ingredients of the adhesive. Solenoid valve 40 is connected to line 38 and spray line 42 is connected to valve 40 and is positioned to spray that adhesive ingredient into mixing chamber 32. Solenoid valve 40 is controlled by solenoid 44.

Also mounted upon the top of mixing chamber 32 is pump 46. Pump 46 comprises air cylinder 48 which is connected to an appropriate solenoid valve and which solenoid valve is controlled by solenoid 50, see FIG. 11, so that actuation of the solenoid causes introduction of pressured air into cylinder 48 to drive its piston down. Its piston rod, in turn, acts as the piston in pump cylinder 52. Another adhesive ingredient is supplied by line 54 to the pump cylinder and valves are arranged so that adhesive ingredient is sprayed into mixing chamber 32 through line 56.

In the preferred use of the machine and in the preferred method, polyurethane foam is the chopped material fed to mixing chamber 32. During or after the introduction of the chopped foam material, motor 34 is operated to tumble the foam particles in chamber 32. During such tumbling, pump 46 is actuated. The preferred material introduced by pump 46 is toluene diisocyanate. A sufficient quantity is introduced under a high enough pressure to spray and coat the particles of foam being tumbled in chamber 32. Mixing continues after the introduction of the toluene diisocyanate for a sufficient length of time so that all of the particles can be tumbled together to give a uniform coating of the toluene diisocyanate. Thereafter, valve 40 is opened by energization of solenoid 44. In the preferred use, the other adhesive component is a 10 percent solution of potassium hydroxide in water. It is also sprayed into the mixing chamber while the particles are being tumbled so that good mixing is accomplished. Mixing continues after the completion of introduction of potassium hydroxide until all particles are well coated with the adhesive. The bottom of mixing chamber 32 is equipped with door 58 which is opened to pour out the contents of the mixing chamber.

Molding section 14 comprises framework 60 which has tracks 62 and 64 thereon. Tracks 62 and 64 carry buggies 66 and 68. Both buggies 66 and 68 are movable along tracks 62 and 64 to occupy different stations thereon. Station 70 is the filling station because it is located immediately below mixing chamber 32. Station 70 is at the center of the tracks. The alternate end stations 72 and 74 are press stations. Press stations 72 and 74 are identical so that only station 74 is shown in detail in FIG. 2. Buggy 66 alternates between stations 70 and 72 while buggy 68 alternates between stations 72 and 74.

Buggies 66 and 68 are also identical, and for purposes of description, only buggy 66 will be described. Buggy 66 is provided with wheels 76 for support of its main frame 78. Raising cylinder 80 is mounted upon main frame 78 and has its piston rod 82 extending upward and secured to upper frame 84. Upper frame 84 has downwardly extending tubes 86 and 88 secured thereto, which tubes telescopically embrace upwardly extending rods secured to main frame 78. Thus, upper frame 84 is vertically reciprocal with respect to main frame 78 by actuation of the piston in cylinder 80.

Transverse tracks 90 and 92 are positioned on top of the upper frame of each of the buggies 66 and 68. Mold dollies 94 and 96 are respectively mounted upon these tracks on the two buggies. Mold dollies 94 and 96 each have upstanding mold support posts, several of which are illustrated at 98 and 100. An individual mold 102 is illustrated in more detail in FIGS. 4 through 6. As is seen therein, the mold 102 comprises a mold of relatively uniform thickness which has a planar top which is defined by outwardly extending flanges around the mold cavity 104. These outwardly extending flanges are positioned on the top of posts 98 and 100 to support the mold 102 above the base of mold dolly 94.

As is seen with respect to mold buggy 68 in FIG. 2, the upper frame carries cylinders 106 and 108. These cylinders have pistons therein with their piston rods respectively shown at 110 and 112. Mounted on top of the piston rods 110 and 112 is mold extension 114. As is seen in FIGS. 4 and 5, mold extension 114 has an opening 116 therethrough which corresponds with the outline of mold cavity 104. Thus, the mold 102 can be placed on the support posts on the mold when the extension 114 is raised, as is shown in FIG. 2. The lowering of mold extension 114 is caused by lowering of the pistons in cylinders 106 and 108, which are controlled from a suitable fluid pressure source and valves. When the mold extension is in the lowered position, as is seen in station 70 in FIG. 2, as well as in FIGS. 4, 5 and 6, the mold extension lies next to the mold and is adapted to guide the chopped foam material which is coated with adhesive into the mold cavity.

Frame 60 also has stations 118 and 120, as is seen in FIG. 3. Frame 60 carries tracks 122 and 124 which are respectively aligned with tracks 90 and 92 when buggy 66 is at station 72. This permits the withdrawal of mold dolly 94 from the buggy to station 118. Similarly, tracks 126 and 128 are positioned on the frame and extend to station 120. These tracks respectively align with the tracks on buggy 68 when it is positioned in station 74. Mounted conveniently near stations 118 and 120 is a curing furnace 130, see FIG. 8, so that the filled molds may be quickly and conveniently moved into and out of the furnace.

Referring to FIGS. 4 through 10, a plurality of molds 102 are provided for molding articles by the present method on the described machine. These molds preferably have no more than two outlined configurations, for only two mold extensions 114 are provided in the machine at any one time, although they may be changed for change-over in production. A mold cover 132 is provided for each mold 102. The mold cover 132 has an outline configuration the same as the outline of the mold cavity and is arranged so that it will pass within opening 116 in mold extension 114. A plurality of latches 134 are secured to the top of each mold 102 around the cavity therein. When the mold cover 132 is pressed in place, it is engaged under these latches so that the bottom of the mold cover 132 lies in substantially the same plane as the top of the flanges around the edge of the mold. Cavities 136 are cut into mold extension 114 to accept these latches. At station 72 and 74 compression pins 138 extend downward from the top of the frame 60. The pins 138 are arranged in such a position that when the upper frame 84 is raised, carrying with it mold dolly 94, mold 102 and mold extension 114, the pins engage mold cover 132 and thrust it down through the opening in mold extension 114 until it engages under the latches 134. This is seen in FIGS. 6 and 9.

In operation, polyurethane foam is fed to hopper 18 and is shredded in shredder 16. It is delivered to storage tank 22 through discharge line 20. A mold is placed on mold dolly 96 at station 118. It is rolled into mold buggy 68 at station 74 and mold extension 114 is lowered. Thereupon, mold buggy 68 is rolled into station 70 and is ready to receive the filling mixture.

A predetermined amount of filling mixture is mixed in chamber 32. As is seen in FIG. 11, timers 140, 142, 144 and 146 are connected across power lines. These power lines are energized when a batch of mixture is to be produced in mixing chamber 32. First, timer 140 times out and energizes motor 28 for a predetermined length of time. This length of time, for example for a particular batch, is sufficient to extrude 100 grams of foam into chamber 32 by means of rotation of screw 26. Motor 34 may begin operating at the same time as the energization of the motor 28 or its rotation may start later. In any event, motor 34 is rotated and mixer blades 36 are tumbling the particles of foam in mixing chamber 32 prior to introduction of adhesive material. Next, timer 146 times out for the energization of solenoid 50 and the actuation of cylinder 48. This sprays into chamber 32, for example, 13 grams of toluene diisocyanate. Mixing continues after this input has ceased so that the foamed particles are well coated with the toluene diisocyanate. Next, timer 142 times out for the energization of solenoid 44 and the opening of valve 40 for a sufficient length of time to spray 12 grams of 10 percent potassium hydroxide and water into the mixing chamber. During the introduction of the adhesive components, the mixer blades continue to run, and they continue to run for an additional period after the potassium hydroxide input is completed until all foam particles are well coated. The potassium hydroxide acts as an accelerator or activator for the toluene diisocyanate, which promply becomes of adhesive nature. After mixing is fairly complete, timer 144 de-energizes motor 34, which signals that the mixture is ready for dumping. Thereupon door 58 is opened and the contents of mixing chamber 32 are poured into the mold. This state of affairs is shown in FIG. 4.

Next mold cover 132 is put in place to cover the mixture 148, as is illustrated in FIG. 5. Then the buggy is moved to the open end station, and cylinder 80 is actuated to raise the entire structure. Pins 138 engage the mold cover and press it down, compressing the mixture into the mold cavity and the mold cover latches in place. This is the situation seen in FIG. 6.

Thereupon, cylinders 106 and 108 are actuated to raise mold extension 114 and the mold dolly is rolled out to station 118. The mold, with its cover in place, is placed in oven 130. Oven 130 is preferably a high frequency electronic oven, which takes about 7 seconds to cure the adhesive. After the mold and its cover are removed from the oven, they are set aside for about 5 minutes to permit the water vapor to escape before the mold is opened. After this time, the mold is opened and the finished resilient article is removed from the mold. Thereafter, the finished article is covered or otherwise processed and the mold is returned to service. The two sides of the machine 10 are alternately used with the buggies 66 and 68 alternately moving from their outer positions to the station 70. At their outer positions empty molds are loaded upon the mold dollies and filled molds are removed from the dollies and placed in the oven. As noted, when removed from the oven there is a five minute wait while the moisture escapes, but a sufficient supply of molds is kept available so that mold can be continuously cycled through the machine 10 and articles molded therein.

This invention having been described in its preferred embodiment, it is clear that it is susceptible to numerous modifications and embodiments within the ability of the routine artisan and without the exercise of the inventive faculty.

I claim:

1. A machine for molding articles from particles of chopped resilient foamed material, said machine comprising a mixing section and a molding section having a press station, the improvement comprising:

said mixing section including a mixing chamber having movable mixing blades therein, means to deliver a predetermined quantity of foam particles to said mixing chamber, means to drive said mixing blades to tumble the particles of chopped foamed material in said mixing chamber, inlet means, said inlet means being arranged to deliver a predetermined quantity of adhesive to said mixing chamber while said mixer blades are tumbling the foamed particles so that the adhesive coats the foamed particles, outlet means on said mixing chamber;

said molding section comprising buggy rails extending substantially under said mixing chamber, a buggy on said buggy rails, a cylinder on said buggy and mold mounting means mounted on said buggy and adapted to be moved upwardly thereon by actuation of said cylinder;

said buggy rails extending to said press station within said molding section, means at said press station interacting with a mold on said buggy so that when said cylinder is actuated to move said mold mounting means and mold upwardly adhesive coated foamed material in the mold is compressed.

2. The apparatus of claim 1 wherein said mixing section additionally comprises a storage vessel and a conveyor means interconnected between said storage vessel and said mixing chamber, said storage vessel having an agitator therein, said means to discharge chopped foamed material to said mixing chamber comprising motive means to drive said agitator and to drive said conveyor so that upon actuation of said motive means, said agitator agitates chopped fomed material in said storage vessel and said conveyor conveys chopped foamed material from said storage vessel into said mixing chamber.

3. The apparatus of claim 1 wherein said adhesive inlet means comprises a pump and a cylinder connected to drive said pump, said pump being arranged to spray a first adhesive component into said mixing chamber while chopped foamed material particles are being tumbled therein, and said adhesive inlet means further comprises inlet means into said chamber adapted to spray another adhesive component into said chamber after the chopped foamed particles therein are substantially coated with said first adhesive component and while the coated particles are being tumbled by said mixer blades.

4. The apparatus of claim 1 wherein said buggy comprises a main frame, an upper frame mounted for movement normal to said buggy rails on said main frame, said cylinder being connected between said main frame and said upper frame to cause movement of said upper frame normal to said buggy rails, support posts mounted on said upper frame, a mold mounted on said support posts, said mold having retention latches thereon and a cover adapted to be secured to said mold by said retention latches, stationary compression pins mounted on said molding section at said press station so that when said buggy is at said press station and said cylinder is actuated, the mold is raised and the mold cover is forced into engagement with said mold latches thereby compressing adhesive coated chopped foamed material into said mold and retaining it by retention of said cover by said latches.

5. The apparatus of claim 1 wherein said mold buggy has an upper frame and an upright mold support pins mounted on said upper frame, a mold mounted on said support pins, said mold having a cavity, at least one cylinder mounted upon said upper frame, a mold extension mounted on said cylinder, said mold extension having an opening therethrough of substantially the same configuration as the mold cavity so that upon actuation of said cylinder on said upper frame, said mold extension is moved into contact with said mold with said opening in said mold extension substantially corresponding to the mold cavity so that adhesive coated chopped foamed material dumped into the opening of said mold extension is constrained to lie above said mold cavity.

References Cited

UNITED STATES PATENTS

| | | | |
|---|---|---|---|
| 2,543,292 | 2/1951 | Kany | 25—2 |
| 2,755,505 | 7/1956 | Bishop | 18—4 |
| 3,042,973 | 7/1962 | Brockhues et al. | 18—5 XR |
| 3,389,427 | 6/1968 | Reyburn | 18—4 |

WILLIAM J. STEPHENSON, Primary Examiner

U.S. Cl. X.R.

18—5